(12) United States Patent
Strickroth

(10) Patent No.: US 11,083,995 B2
(45) Date of Patent: Aug. 10, 2021

(54) ELIMINATION OF $SO_2$ AND $CO_2$ FROM A GAS

(71) Applicant: CPPE CARBON PROCESS & PLANT ENGINEERING S.A., Luxembourg-Dommeldange (LU)

(72) Inventor: Alain Strickroth, Belvaux (LU)

(73) Assignee: CPPE CARBON PROCESS & PLANT ENGINEERING S.A., Luxembourg-Dommeldange (LU)

( * ) Notice: Subject to any disclaimer, the term of this patent is extended or adjusted under 35 U.S.C. 154(b) by 0 days.

(21) Appl. No.: 16/955,110

(22) PCT Filed: Oct. 8, 2018

(86) PCT No.: PCT/EP2018/077299
§ 371 (c)(1),
(2) Date: Jun. 18, 2020

(87) PCT Pub. No.: WO2019/072756
PCT Pub. Date: Apr. 18, 2019

(65) Prior Publication Data
US 2020/0384410 A1    Dec. 10, 2020

(30) Foreign Application Priority Data

Oct. 9, 2017 (LU) ...................... 100 469

(51) Int. Cl.
*B01D 53/50* (2006.01)
*B01D 53/62* (2006.01)
(Continued)

(52) U.S. Cl.
CPC ........... *B01D 53/75* (2013.01); *B01D 53/508* (2013.01); *B01D 53/62* (2013.01); *B01D 53/73* (2013.01);
(Continued)

(58) Field of Classification Search
CPC ...... B01D 53/50; B01D 53/507; B01D 53/62; B01D 53/75; B01D 2251/2062;
(Continued)

(56) References Cited

U.S. PATENT DOCUMENTS 8,329,128 B2 * 12/2012 Dube ................. B01D 53/1475
423/220
2008/0178733 A1    7/2008 Gal

FOREIGN PATENT DOCUMENTS

CN    102061261 B    4/2013
KR    101725377 B1   4/2017
(Continued)

OTHER PUBLICATIONS

International Search Report for PCT/EP2018/077299 dated Oct. 29, 2018.
Written Opinion for PCT/EP2018/077299 dated Oct. 29, 2018.

*Primary Examiner* — Timothy C Vanoy
(74) *Attorney, Agent, or Firm* — Sandberg Phoenix and von Gontard, P.C.

(57) ABSTRACT

A process to treat/clean a gas, containing $SO_2$, $CO_2$ and $O_2$ comprising the steps of: bringing the gas in contact with an activated carbon catalyst, converting $SO_2$ to $SO_3/H_2SO_4$ on the activated carbon catalyst, washing the $SO_3/H_2SO_4$ from the activated carbon catalyst to obtain a sulfuric acid solution and a $SO_2$ depleted gas; bringing the $SO_2$ depleted gas in contact with an aqueous ammonia solution wherein $CO_2$ is converted to obtain a $SO_2$ and $CO_2$ depleted gas containing ammonia; and bringing the $SO_2$ and $CO_2$ depleted gas containing ammonia in contact with the sulfuric acid solution obtained in step a. to form a solution containing ammonium sulfate and a treated, clean gas.

17 Claims, 1 Drawing Sheet

(51) Int. Cl.
 *B01D 53/73* (2006.01)
 *B01D 53/75* (2006.01)
 *B01D 53/86* (2006.01)

(52) U.S. Cl.
 CPC .. *B01D 53/8609* (2013.01); *B01D 2251/2062* (2013.01); *B01D 2257/302* (2013.01); *B01D 2257/504* (2013.01); *B01D 2258/025* (2013.01); *B01D 2258/0283* (2013.01)

(58) Field of Classification Search
 CPC ........ B01D 2253/102; B01D 2257/302; B01D 2257/504; B01D 2258/0283
 See application file for complete search history.

(56) References Cited

FOREIGN PATENT DOCUMENTS

| | | | |
|---|---|---|---|
| WO | 2011138425 | A1 | 11/2011 |
| WO | 2014075718 | A1 | 5/2014 |

* cited by examiner

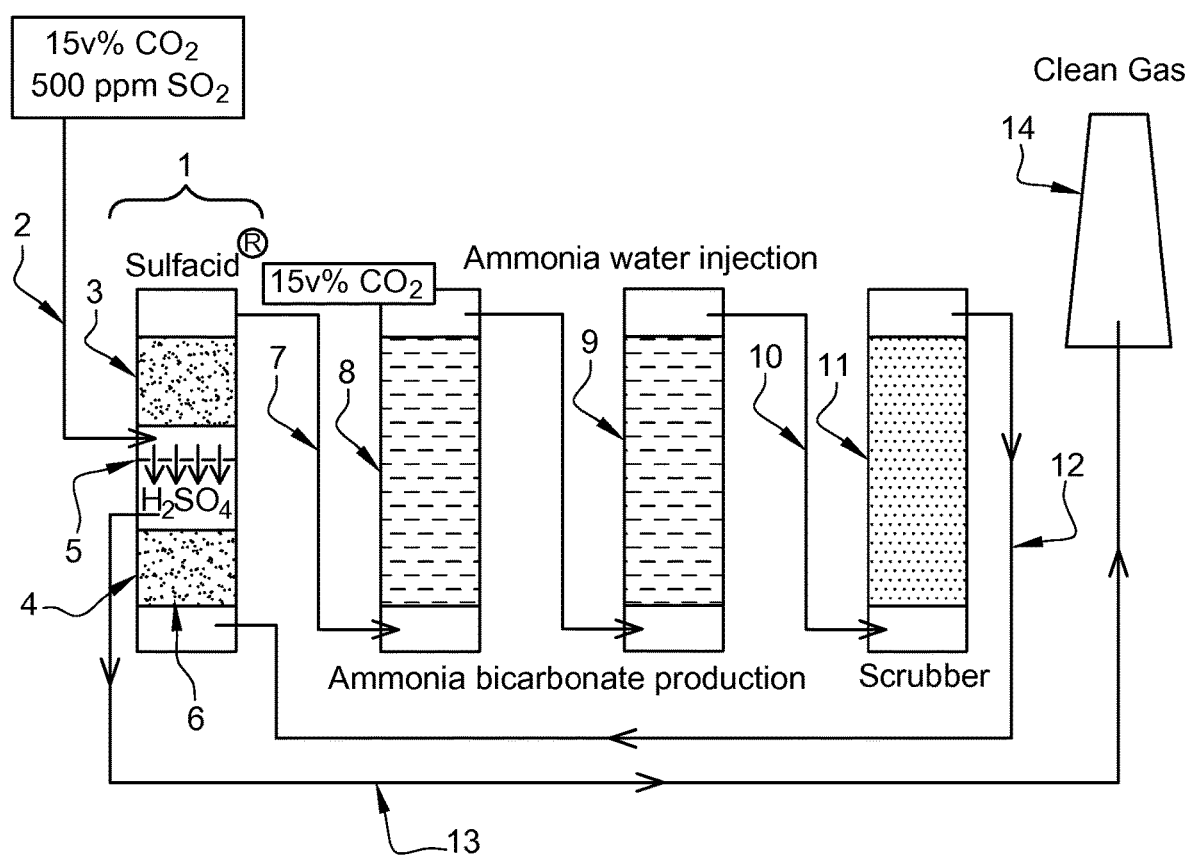

ELIMINATION OF $SO_2$ AND $CO_2$ FROM A GAS

CROSS-REFERENCE TO RELATED APPLICATIONS

The present invention is the US national stage under 35 U.S.C. § 371 of International Application No. PCT/EP2018/077299, which was filed on Oct. 8, 2018, and which claims the priority of application LU 100469 filed on Oct. 9, 2017, the content of which (text, drawings and claims) are incorporated here by reference in its entirety.

FIELD

The present invention generally relates to a method for eliminating $SO_2$ and $CO_2$ from a gas.

BACKGROUND

Most of the energy used in the world is derived from the combustion of carbon and hydrogen-containing fuels such as coal, oil and natural gas. The combustion of such fuels generally results in the production of flue gas streams that contain various contaminants in the form of ash, $CO_2$, sulfur compounds (often in the form of sulfur oxides, commonly referred to as $SO_x$, e.g., $SO_2$, $SO_3$ and the like), nitrogen compounds, (often in the form of nitrogen oxides referred to as "$NO_x$"), chlorine, mercury, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of such contaminants. Numerous processes and systems have been developed in response to the desire to achieve near zero emission of contaminants.

In conventional industrial technologies for gas purification, impurities, such as $H_2S$, $SO_2$, $CO_2$ and/or COS are removed from a gas stream such as flue gas, natural gas, syngas or other gas streams by absorption in a liquid solution, e.g., in a liquid solution comprising ammonia and/or one or more amine compounds. The used liquid solution is subsequently regenerated in a regenerator column to release the impurities comprised in the solution, typically by countercurrent contacting with steam. The steam needed for regeneration is typically produced by power plant turbine system. In addition, a reboiler in fluid communication with the regeneration column may provide further release of impurities comprised in the liquid solution.

In current chilled ammonia processes and systems, ammonia slip from the main $CO_2$ absorber is first captured in a water wash vessel and subsequently regenerated in the ammonia recovery stripper by heating the ammoniated rich solution with saturated steam. The ammoniated slip solution typically has a $NH_3$ molarity of 0.1 to 2.0 mol/liter, depending on the operating conditions. The current ammonia recovery process from the stripper is an expensive process (approximately 20% heat duty of the main $CO_2$ regenerator) in terms of both capital and operating cost because it is very difficult to integrate stripper overhead heat with the main regenerator network.

More specifically, a process for amine, respectively ammonia slip elimination in a multi-stage scrubber with high liquid to gas ration followed by a final wash-water polishing stage is described in more detail in US 2013/0092026. An alternative process is described in US 2009/0101012, where a cooled liquid at temperature range between 0 and 10° C. is applied in the final stage resulting in a minimization of ammonia content from the gas stream. It is also possible to down-regulate the ammonia level by using an ammonium sulfate solution or an ammonium sulfate aerosol in the reaction vessel (cf. for example U.S. Pat. No. 6,187,278 or 6,221,325) or adsorption/desorption material applied to one or several heat exchangers (cf. for example U.S. Pat. No. 6,264,905). Finally, two patent applications US 2011/0308389 and US 2016/0288050 describe that the depletion of ammonia is realized via a scrubber filled with an acid media. This acid scrubbing or wash section is installed after a main ammonia slip control system composed by a wash water module.

US2008/0178733 discloses a method of cleaning a process gas containing carbon dioxide and sulphur dioxide, said method including removing, at least partly, carbon dioxide from the process gas by means of, in a first step, cooling the process gas, and, in a second step, bringing the cooled process gas into contact with an ammoniated solution or slurry absorbing at least a part of the carbon dioxide, the method being characterized in that said first step comprising cooling the process gas by means of bringing the process gas into direct contact with a cooling liquid, and absorbing into the cooling liquid at least a part of the sulphur dioxide of the process gas, such that a cooling liquid containing sulphate is obtained, said second step comprising contacting the cooled process gas with the ammoniated solution or slurry to remove, at least partly, carbon dioxide from the process gas, and to form a process gas containing ammonia, and in a third step removing, at least partly, ammonia from the process gas containing ammonia by means of bringing the process gas containing ammonia into direct contact with the cooling liquid containing sulphate.

WO 2014/075718 A1 relates to a two-stage conversion of sulphur dioxide to sulphuric acid in a wet-catalytic process, the first reactor is operated at approx. 420° C. with conventional activated charcoal catalysts such as platinum and vanadium pentoxide while the second reactor already produces sulphuric acid at approx. 70° C. with activated charcoal and/or cobalt catalyst on the surface and same are washed out with dilute acid which is worked back up to concentrated sulphuric acid in the collective method.

All the before-mentioned processes for the removal of non-used reagents, like ammonia from flue gas require complex process control systems with high operation costs due to continuous need of cooling the liquid abatement unit or the steady addition of a chemical reagent.

SUMMARY

It is an object of the present invention to enhance the performance of the removal of $SO_2$ and $CO_2$ from gas (in particular from natural gas, syngas, flue gas generated i.e. by combustion of carbon and hydrogen-containing fuels such as coal, oil and natural gas, by chemical processes, by metallurgical processes, . . . ).

It is in particular an object to eliminate the so-called ammonia slip i.e. the amount of unreacted ammonia emitted from equipment to filter impurities from a gas.

The present invention proposes in particular a process to treat/clean a gas, containing $SO_2$, $CO_2$ and $O_2$, comprising the steps of:

a. Bringing the gas in contact with an activated carbon catalyst, converting $SO_2$ to $SO_3/H_2SO_4$ on the activated carbon catalyst, washing the $SO_3/H_2SO_4$ from the activated carbon catalyst to obtain a sulfuric acid solution and a $SO_2$ depleted gas, b. Bringing the $SO_2$ depleted gas in contact with an aqueous ammonia solution wherein $CO_2$ is converted/eliminated/precipitated/dissolved to obtain a $SO_2$ and $CO_2$ depleted gas containing ammonia, c. Bringing the $SO_2$ and $CO_2$ depleted gas containing ammonia in contact with the sulfuric acid solution obtained in step a. to form a solution containing ammonium sulfate and a treated/clean gas (a $SO_2$, $CO_2$ and ammonia depleted gas).

The object is thus achieved by the process as claimed in claim 1.

This invention thus describes a process for the elimination of $SO_2$, $CO_2$ and ammonia from a gas stream wherein the gas stream is injected in/passed through a scrubber comprising a sulfuric acid solution; this solution is produced on-site from sulfur dioxide, a component of the inlet gas.

In particular, the inlet gas, containing between 5 and 20 v % of $O_2$, between 2 and 20 v % of $CO_2$, between 50 and 5000 ppm $SO_2$, enters a first reactor with a fixed-bed comprising an activated carbon catalyst. On the catalytic surface of the activated carbon catalyst, the sulfur dioxide is converted with oxygen to sulfur trioxide which reacts in turn with water to form a sulfuric acid on the activated carbon catalyst. This sulfuric acid is washed from the activated carbon catalyst bed by spraying an aqueous solution, respectively water, on top of the activated carbon catalyst bed at intervals of 5, 10 or 15 minutes depending on the quantity of $H_2SO_4$ formed on the catalyst to obtain a sulfuric acid solution. This sulfuric acid solution is recovered in a tank and is transferred to a down-stream reactor, described in more detail hereafter.

The activated carbon catalyst or the mixture of the activated carbon catalyst and the filler material is washed in step a. in various instances with water or an aqueous solution in an amount between 5 l/hour/m³ of activated carbon catalyst and 100 l/hour/m³ of activated carbon catalyst.

The activated carbon catalyst is in various instances extruded and has a grain size of 0.80 to 130 mm. The activated carbon catalyst is in various instances granulated and has a grain size of 0.30 to 4.75 mm.

In an exemplary embodiment the activated carbon catalyst is in various instances a mixture of granulated and extruded catalyst.

The activated carbon catalyst can be produced from brown and bituminous coals, fruit pits, coconut shells, lignite, peat, wood, sawdust/sawchip, petroleum coke, bone and paper mill waste (lignin), synthetic polymers like PVC, rayon, viscose, polyacrylonitrile or phenols.

The carbon catalyst can be activated by:
a physical treatment: heat, steam, oxygen, $CO_2$, air;
a chemical treatment: impregnation with acid, strong base or salts (e.g. sulfuric, chlorohydric or phosphoric acid, potassium or sodium hydroxide, calcium or zinc chloride);
a combination of both a physical and a chemical treatment.

The activated carbon catalyst can have a specific surface area (BET): 400 to 1800 m²/g and an acid or alkaline pH.

In an exemplary embodiment the activated carbon catalyst can comprise an inert filler material. In particular, in various instances a mixture from 95% vol. to 50% vol. of activated carbon catalyst and from 5% vol. to 50% vol. of an inert filler material is preferred.

In an exemplary embodiment the mixture is soaked by water or an acid or alkaline aqueous solution before use.

Alternatively the mixture is dry.

Surprisingly, the fact that the activated carbon catalyst is mixed with a filler material allows obtaining a more complete removal of $SO_2$ from the gas.

In various embodiments at least 5% vol 6% vol, 7% vol, 8% vol, 9% vol, 10% vol, 11% vol, 12% vol, 13% vol, 14% vol, 15% vol, 16% vol, 17% vol, 18% vol, 19% vol, 20% vol, 21% vol, 22% vol, 23% vol, 24% vol, 25% vol, 26% vol, 27% vol, 28% vol, 29% vol, or at least 30% vol of filler are used in the mixture of activated carbon catalyst and a filler material.

In various embodiments at most 50% vol 49% vol, 48% vol, 47% vol, 46% vol, 45% vol, 44% vol, 43% vol, 42% vol, 41% vol, 40% vol, 39% vol, 38% vol, 37% vol, 36% vol, 35% vol, 34% vol, 33% vol, 32% vol, 31% vol, or at most 30% vol. of filler are used in the mixture of activated carbon catalyst and a filler material.

In an exemplary embodiment, the filler material is between 10% vol. and 30% vol. of the mixture of activated carbon catalyst and a filler material.

In an exemplary embodiment, the filler material can comprise an active catalyst material (e.g. V, Fe, Zn, Si, $Al_2O_3$, . . . ).

In various instances the filler is chosen from fillers made of ceramic material, made of metal, fillers made of plastic material or mixtures thereof. In various instances, the filler material comprises plastic, metals, alumina, ceramic materials or mixture thereof.

According to various embodiments, the filler material is a shape chosen among saddle shaped, ring shaped, ball shaped, torus shaped, prism shaped or irregular shaped.

The $SO_2$-depleted gas, which still contains the $CO_2$ and $O_2$, is transferred from the first reactor to a second reactor, it being understood that the second reactor can also be two or more serial and/or parallel reactors.

The second reactor/scrubber is sprayed in counter-current with an ammonia solution with a concentration between 0 and 20 w %. In this second reactor, the $CO_2$ from the gas reacts with ammonia ($NH_3$) from the solution to form at least one of the following three solid components: ammonia bicarbonate, ammonia carbonate or ammonia carbamate depending on the $CO_2/NH_3$ ratio and the reaction temperature. This ammonia bicarbonate/carbonate/carbamate solution will be cooled via heat-exchanger and then transferred to a precipitating unit, in which the formed solids will crystallize and be separated via centrifuge, decantation and/or filtration. The gas with low/depleted levels of $SO_2$ and $CO_2$ containing ammonia is sucked out of the second reactor and transported to a washing scrubber. Wash water is added to the top of the scrubber and enters the scrubber section filled with inert material. In this section, the wash water adsorbs the major part of ammonia from the gas and a solution containing ammonia hydroxide exits the scrubber. In a next step, this ammonia hydroxide solution is saturated with ammonia in a gas-liquid reactor by addition of ammonia from gas bottles. Then, the resulting saturated ammonia solution is transferred to the second reactor in which $CO_2$ reacts with $NH_3$ as described previously.

It is understood that the "aqueous ammonia solution" in step b. can comprise ammonia, urea or a mixture thereof. It can also contain only urea i.e. no ammonia.

The content of ammonia in the "aqueous ammonia solution" is in various instances between 0 and 20 w %. In various exemplary embodiments the "aqueous ammonia solution" contains at least 1 w %, 2 w %, 3 w %, 4 w %, 5 w %, 6 w %, 7 w %, 8 w %, 9 w %, 10 w %, 11 w %, 12 w %, 13 w % or in various instances at least 14 w % ammonia. In various instances the "aqueous ammonia solution" contains less than 19 w %, 18 w %, 17 w %, 16 w %, 15 w %, 14 w %, 13 w %, 12 w %, 11 w %, 10 w %, 9 w %, 8 w %, 7 w %, 6 w % or in various instances less than 5 w % ammonia.

The content of urea in the "aqueous ammonia solution" is in various instances between 0 and 55 w %. In various exemplary embodiments the "aqueous ammonia solution" contains at least 1 w %, 2 w %, 3 w %, 4 w %, 5 w %, 6 w %, 7 w %, 8 w %, 9 w %, 10 w %, 11 w %, 12 w %, 13 w %, 14 w %, 16 w %, 18 w %, 20 w %, 22 w %, 24 w %, 26 w %, 28 w %, 30 w %, 32 w %, 35 w %, 38 w %, 40 w %, 43 w %, 46 w %, 49 w %, 50 w %, 51 w %, 52 w %, or in various instances at least 53 w % urea. In various exemplary embodiments the "aqueous ammonia solution" contains in various instances less than 53 w %, 52 w %. 50 w %, 48 w %, 46 w %, 44 w %, 42 w %, 40 w %, 38 w %, 36 w %, 34 w %, 32 w %, 30 w %, 28 w %, 26 w %, 24 w %, 22 w %, 20 w %, 18 w %, 16 w %, 14 w %, 12 w %, 11 w %, 10 w %, 9 w %, 8 w %, 7 w %, 6 w % or in various instances less than 5 w % urea.

Finally the gas that exits the second reactor/scrubber, containing between 0 and 5000 ppm of ammonia, will be transported to a third reactor/final scrubber in which the produced sulfuric acid solution from the first reactor will be added via the top of a third reactor. In this final scrubber, the sulfuric acid solution reacts with the ammonia remaining in the gas (the ammonia slip) and forms ammonia sulfate. The gas almost free of $SO_2$ (<15 ppm), $CO_2$ (<0.5 v %), and $NH_3$ (<10 ppm) will be transferred to the stack and released in the environment. This scrubber can be filled with an activated carbon catalyst bed, with a mixture of an activated carbon catalyst bed and an inert filler material just like the first reactor or with just a filler material, which can be the same as the filler material used in the first reactor.

The ammonia sulfate solution can be used in further process steps.

BRIEF DESCRIPTION OF THE FIGURES

Further details and advantages of the invention can be taken from the following detailed description of possible exemplary embodiments of the invention on the basis of the accompanying FIG. 1. in the drawings:

FIG. 1 is a schematic view of the arrangement to treat/clean a gas, containing $SO_2$, $CO_2$ and $O_2$, in accordance with various exemplary embodiments of the invention.

DETAILED DESCRIPTION

The system contains three stages.

In a first stage, a gas containing 15% v/v $CO_2$, 500 ppm $SO_2$ and 14% v/v $O_2$, is transferred into a first reactor 1. In this particular gas, an exhaust gas from a clinker plant was used.

In this particular design, the first reactor 1 contains two vertically stacked beds 3, 4 of an activated carbon catalyst, each with a height between 0.5 and 2.0 meters. It is clear that one could also have used two separate reactors.

The gas 2, with for example 18% v/v $O_2$, 15 v % of $CO_2$, and 500 ppm of $SO_2$ (the rest being $N_2$), passes through the upper bed 3 of an activated carbon catalyst and travels from the bottom to the top of the activated carbon bed 3 by means of a fan (not shown). In this step only $SO_2$ is removed and converted to sulfuric acid on the activated carbon catalyst's surface according to the following reaction:

$$SO_2 + \tfrac{1}{2}O_2 + nH_2O \Rightarrow H_2SO_4 \cdot (n-1)H_2O$$

The sulfuric acid is then washed from the upper activated carbon catalyst bed and then sprayed on top of the lower activated carbon catalyst bed 4.

In the second stage, the $CO_2$ contained in the gas is removed by absorption in an aqueous ammonia solution with formation of ammonium bicarbonate.

After removal of $SO_2$ and formation of sulfuric acid, the gas stream with $CO_2$ (7) is transferred in a first absorber 8 and then in a second absorber 9 containing an aqueous ammonia solution. The formation of ammonium bicarbonate or ammonia carbonate or ammonium carbamate takes place at these two absorbers 8, 9 by reaction of $CO_2$, water and ammonia.

$$CO_2 + H_2O + NH_3 \rightarrow (NH_4)(HCO_3)$$

The produced ammonia bicarbonate, or ammonia carbonate or carbamate solution is cooled-down in a heat exchanger (not shown) and then transferred to a precipitator (not shown) in which the crystallized product is separated from the liquid phase. This liquid, containing still some ammonia, is transferred back to the two absorbers 8, 9.

Third Stage: Avoid the release of ammonia slip into the air.

In the third stage, the gas leaving the two absorbers 8, 9 contains now some ammonia evaporated from the aqueous ammonia solution and this ammonia rich gas stream 10 passes through a reactor 11 containing a bed of activated carbon, with a height between 0.5 and 2.0 meters. In this reactor 11, wash water is added countercurrent on top of the reactor. This water reacts with ammonia, contained in the gas on the surface of activated carbon, and ammonium hydroxide is produced and taken up by the aqueous solution in the reactor:

$$H_2O + NH_3 \rightarrow NH_4OH$$

The ammonium hydroxide solution is enriched with gaseous $NH_3$ and then transferred to the two-reactor system 8, 9.

In parallel, the gas stream which still contains NH3 is transferred via a gas conduct 12 to the final scrubber unit 6 (in the first reactor) which contains the sulfuric acid produced on the activated carbon catalyst bed 3 during the first stage of the process. Ammonia and sulfuric acid react and form ammonium sulfate according to the following reaction.

$$H_2SO_4 + 2NH_3 \rightarrow (NH_4)_2SO_4$$

The cleaned gas is released to the chimney/stack 14.

Results from Pilot Tests

| Test 1: The test was carried out under the following conditions: | | | |
|---|---|---|---|
| Raw gas volume flow | min. | 260 | m³/h |
|  | max. | 310 | m³/h |
| SO₂ content (inlet) | min. | 400 | ppm |
|  | max. | 800 | ppm |
| CO₂ content (inlet) | min. | 5.5 | v % |
|  | max. | 6.5 | v % |
| Waste gas temperature | min. | 78 | ° C. |
|  | max. | 82 | ° C. |
| O₂ content |  | >20 | v % |

The reactor is made of inert glass fiber reinforced plastics material, has a volume of approximately 2 m³ and is filled with 0.6 m³ of an activated carbon catalyst of the Norit®_RST-3 type.

The test system was run for approximately 5 hours with the exhaust from a clinker production. The $SO_2$ and $CO_2$ content of the flue gas was measured at the inlet of the first reactor 3 and at the outlet of the stack 14 as described above. In addition, the ammonia slip was measured at the stack. The $SO_2$ and $CO_2$ concentration fluctuated repeatedly between 500 ppm and 700 ppm for $SO_2$ and around 6 v % for $CO_2$, with a $SO_2$ removal efficiency superior to 98% and a $CO_2$ conversion efficiency of 51%. The ammonia solution was added continuously over 5 hours and the measured ammonia slip outlet was below 15 ppm over this time period.

| Test 2: The test was carried out under the following conditions: | | | |
| --- | --- | --- | --- |
| Raw gas volume flow | min. | 270 | m³/h |
| | max. | 320 | m³/h |
| $SO_2$ content (inlet) | min. | 350 | ppm |
| | max. | 700 | ppm |
| $CO_2$ content (inlet) | min. | 6 | v % |
| | max. | 7 | v % |
| Waste gas temperature | min. | 58 | ° C. |
| | max. | 62 | ° C. |
| $O_2$ content | | >20 | v % |

The reactor is made of inert glass fiber reinforced plastics material, has a volume of approximately 2 m³ and is filled with 0.6 m³ of an activated carbon catalyst of the JACOBI_EcoSorb® VRX-Super type.

The test system was run for approximately 7 hours with the exhaust from a clinker production. The $SO_2$ and $CO_2$ content of the waste gases was measured at the inlet to the first reactor and at the outlet of the stack as described above. In addition, the ammonia slip was measured at the stack. The $SO_2$ and $CO_2$ concentration fluctuated repeatedly between 500 ppm and 650 ppm for $SO_2$ and around 6.2 v % for $CO_2$, with a $SO_2$ removal efficiency superior to 98% and a $CO_2$ conversion efficiency of 49%. The ammonia solution was added continuously over 7 hours and the measured ammonia slip outlet was below 15 ppm over this time period.

| Test 3: The test was carried out under the following conditions: | | | |
| --- | --- | --- | --- |
| Raw gas volume flow | min. | 270 | m³/h |
| | max. | 320 | m³/h |
| $SO_2$ content (inlet) | min. | 320 | ppm |
| | max. | 740 | ppm |
| $CO_2$ content (inlet) | min. | 7 | v % |
| | max. | 11 | v % |
| Waste gas temperature | min. | 58 | ° C. |
| | max. | 62 | ° C. |
| $O_2$ content | | >20 | v % |

The reactor is made of inert glass fiber reinforced plastics material, has a volume of approximately 2 m³ and is filled with 0.6 m³ of an activated carbon catalyst of the CHEMVIRON CENTAUR® HSV type.

The test system was run for approximately 11 hours with the exhaust from a clinker production. The $SO_2$ and $CO_2$ content of the waste gases was measured at the inlet to the first reactor and at the outlet of the stack as described above. In addition, the ammonia slip was measured at the stack. The $SO_2$ and $CO_2$ concentration fluctuated repeatedly between 500 ppm and 650 ppm for $SO_2$ and around 9 v % for $CO_2$, with a $SO_2$ removal efficiency superior to 98% and a $CO_2$ conversion efficiency of 50%. The ammonia solution was added continuously over 11 hours and the measured ammonia slip outlet was below 15 ppm over this time period.

| Test 4: The test was carried out under the following conditions: | | | |
| --- | --- | --- | --- |
| Raw gas volume flow | min. | 200 | m³/h |
| | max. | 300 | m³/h |
| $SO_2$ content (inlet) | min. | 0 | ppm |
| | max. | 10 | ppm |
| $CO_2$ content (inlet) | min. | 7 | v % |
| | max. | 18 | v % |
| Waste gas temperature | min. | 20 | ° C. |
| | max. | 45 | ° C. |
| $O_2$ content | | >5 | v % |

The reactor is made of inert glass fiber reinforced plastics material, has a volume of approximately 2 m³ and is filled with 0.5 m³ of an activated carbon catalyst of the Norit®_RST-3 type.

The test system was run for approximately 6 hours with the exhaust from a clinker production. The $SO_2$ and $CO_2$ content of the waste gases was measured at the inlet to the first reactor which is in this particular case a so called Sulfacid® reactor and at the outlet of the stack as described above. In addition, the ammonia slip was measured at the stack. The $SO_2$ and $CO_2$ concentration fluctuated repeatedly between 0 ppm and 10 ppm for $SO_2$ and around 9 v % for $CO_2$, with a $SO_2$ removal efficiency superior to 99% and a $CO_2$ conversion efficiency of 50%. The ammonia solution was added continuously over 6 hours and the measured ammonia slip outlet was below 4000 ppm over this time period.

Test 4 underlines the necessity of $SO_2$ inlet for reduction of ammonia slip!

Although the present invention has been described in considerable detail with reference to certain exemplary versions thereof, other versions are possible. Therefore, the spirit and scope of the appended claims should not be limited to the description of the preferred versions contained herein.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar.

The invention claimed is:

1. A process to treat or clean a gas containing $SO_2$, $CO_2$ and $O_2$, said process comprising the steps of:
    (a) bringing the gas in contact with an activated carbon catalyst, converting $SO_2$ to $SO_3/H_2SO_4$ on the activated carbon catalyst, washing the $SO_3/H_2SO_4$ from the activated carbon catalyst to obtain a sulfuric acid solution and a $SO_2$ depleted gas;
    (b) bringing the $SO_2$ depleted gas in contact with an aqueous ammonia solution wherein $CO_2$ is converted to obtain a $SO_2$ and $CO_2$ depleted gas containing ammonia;
    (c) bringing the $SO_2$ and $CO_2$ depleted gas containing ammonia in contact with the sulfuric acid solution obtained in step (a) to form a solution containing ammonium sulfate and a treated, clean gas.

2. The process of claim 1, wherein the activated carbon catalyst is a mixture of an activated carbon catalyst and a filler material.

3. The process of claim 2, wherein the mixture contains no other solid ingredients than at least one of an activated carbon catalyst and a filler material.

4. The process of claim 2, wherein the filler material is chosen from fillers made of at least one of ceramic material, metal, plastic material and mixtures thereof.

5. The process of claim 2, wherein the filler material is a shape chosen among saddle shaped, ring shaped, ball shaped, torus shaped, prism shaped or irregular shaped.

6. The process of claim 2, wherein the mixture of the activated carbon catalyst and the filler material is in a fixed bed.

7. The process of claim 1, wherein the activated carbon catalyst is washed in step (a) with water or an aqueous solution in an amount between 5 l/hour/m$^3$ of activated carbon catalyst and 100 l/hour/m$^3$ of activated carbon catalyst.

8. The process of claim 1, wherein the activated carbon catalyst is washed by intermittent spraying with at least one of water and an aqueous solution in counter-flow to the gas.

9. The process of claim 1, wherein the gas containing $CO_2$, $SO_2$ and $O_2$ is a natural gas, syngas, flue gas generated by at least one of:
- combustion of carbon and hydrogen-containing fuels;
- chemical processes; and
- metallurgical processes.

10. The process of claim 1, wherein the gas being brought into contact with the activated carbon catalyst has a temperature of between 10 and 150° C.

11. The process of claim 1 wherein the $SO_2$ content of the gas is between 50 and 5,000 ppm.

12. The process of claim 1 wherein the $CO_2$ content of the gas is between 2 and 20 v %.

13. The process of claim 1, wherein the $O_2$ content of the gas is between 5 and 20% vol.

14. The process of claim 1, wherein the $H_2SO_4$ content of the $H_2SO_4$ solution is between 5 and 50% vol.

15. The process of claim 1, wherein the aqueous ammonia solution in step (b) comprises at least one of ammonia, urea and a mixture thereof.

16. The process of claim 1, wherein steps (a) and (c) take place in a same reactor.

17. The process of claim 16, wherein the reactor contains an upper bed of the activated carbon catalyst where step (a) takes place and a lower bed where step (c) takes place.

* * * * *